United States Patent
Takano

(10) Patent No.: US 11,323,703 B2
(45) Date of Patent: May 3, 2022

(54) MOVING-IMAGE ENCODING DEVICE, MOVING-IMAGE ENCODING METHOD, AND PROGRAM

(71) Applicant: NEC Corporation, Tokyo (JP)

(72) Inventor: Fumiyo Takano, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/257,670

(22) PCT Filed: Jun. 18, 2019

(86) PCT No.: PCT/JP2019/024014
§ 371 (c)(1),
(2) Date: Jan. 4, 2021

(87) PCT Pub. No.: WO2020/008858
PCT Pub. Date: Jan. 9, 2020

(65) Prior Publication Data
US 2021/0274169 A1 Sep. 2, 2021

(30) Foreign Application Priority Data
Jul. 3, 2018 (JP) .............................. JP2018-126644

(51) Int. Cl.
*H04N 19/115* (2014.01)
*H04N 19/124* (2014.01)
(Continued)

(52) U.S. Cl.
CPC ......... *H04N 19/115* (2014.11); *H04N 19/124* (2014.11); *H04N 19/14* (2014.11); *H04N 19/15* (2014.11); *H04N 19/172* (2014.11)

(58) Field of Classification Search
CPC .... H04N 19/114; H04N 19/124; H04N 19/15; H04N 19/172; H04N 19/146
See application file for complete search history.

(56) References Cited

U.S. PATENT DOCUMENTS

| | | | |
|---|---|---|---|
| 2006/0093032 A1 | 5/2006 | Shindo | |
| 2014/0328384 A1* | 11/2014 | Novotny | H04N 19/172 375/240.02 |
| 2018/0152700 A1* | 5/2018 | Togita | H04N 19/18 |

FOREIGN PATENT DOCUMENTS

| | | |
|---|---|---|
| JP | H10-164577 A | 6/1998 |
| JP | 2001-025008 A | 1/2001 |

(Continued)

OTHER PUBLICATIONS

International Search Report for PCT Application No. PCT/JP2019/024014, dated Aug. 6, 2019.

(Continued)

*Primary Examiner* — Kyle M Lotfi

(57) ABSTRACT

A moving-image encoding device calculates a code amount generated by encoding a moving image including an I picture, a P picture, and a B picture as picture types, and calculates a complexity history of the picture which is encoded on the basis of the code amount and a quantization width used in the encoding. This moving-image encoding device estimates an estimated complexity of an encoding object picture to be encoded on the basis of the complexity history of an encoded picture of the same picture type as a picture type of the encoding object picture and the complexity history of the encoded picture immediately preceding the encoding object picture.

6 Claims, 4 Drawing Sheets

(51) Int. Cl.
  *H04N 19/14* (2014.01)
  *H04N 19/15* (2014.01)
  *H04N 19/172* (2014.01)

(56) References Cited

FOREIGN PATENT DOCUMENTS

| | | |
|---|---|---|
| JP | 2001-238215 A | 8/2001 |
| JP | 2006-135557 A | 5/2006 |
| JP | 2008-182408 A | 8/2008 |
| JP | 2009-188826 A | 8/2009 |
| JP | 2017-123545 A | 7/2017 |

OTHER PUBLICATIONS

Japanese Office Communication for JP Application No. 2020-528770 dated Nov. 24, 2021 with English Translation.

* cited by examiner

MOVING-IMAGE ENCODING DEVICE, MOVING-IMAGE ENCODING METHOD, AND PROGRAM

This application is a National Stage Entry of PCT/JP2019/024014 filed on Jun. 18, 2019, which claims priority from Japanese Patent Application 2018-126644 filed on Jul. 3, 2018, the contents of all of which are incorporated herein by reference, in their entirety.

TECHNICAL FIELD

The present invention relates to a moving-image encoding device, a moving-image encoding method, and a program.

BACKGROUND ART

Code amount control (bit rate control) for obtaining high image quality within a target code amount is important in order to realize compression encoding of a high-quality moving image. In moving-image encoding devices using a standard such as H.265/High Efficiency Video Coding (HEVC), a generated code amount can be controlled by controlling a quantization width when a predicted residual is quantized. In a case where higher image quality can be maintained by appropriately controlling the quantization width. On the contrary, the control of the quantization width is inappropriate, the code amount is excessively allocated to some pictures and thus the code amount of other pictures is reduced, which leads to degradation in visual image quality.

As a relevant technique, Patent Document 1 discloses a technique of suppressing an increase in a generated code amount by calculating an accurate estimated screen complexity when an image is determined to be a scene change image, especially in the case of encoding on a bi-directional predictive B picture.

In addition, Patent Document 2 discloses a technique of a moving-image encoding device that makes it possible to perform variable rate encoding on a moving image in real time.

In addition, Patent Document 3 discloses a technique of calculating a screen complexity from the generated code amount, average quantization scale, encoded image characteristics, and scene change information of a moving image; determining the allocated code amount of an image to be encoded next from a generated code amount, a screen complexity, and encoded image characteristics; and determining the quantization scale of the image to be encoded next from the allocated code amount.

PRIOR ART DOCUMENTS

Patent Documents

[Patent Document 1]
Japanese Unexamined Patent Application, First Publication No. 2006-135557 [Patent Document 2]
Japanese Unexamined Patent Application, First Publication No. H10-164577 [Patent Document 3]
Japanese Unexamined Patent Application, First Publication No. 2001-238215

SUMMARY OF INVENTION

Problems to be Solved by the Invention

Incidentally, in the code amount control techniques described above, when the generated code amount deviates greatly from the target code amount, image quality degradation and buffer overflow or underflow are caused.

The code amount control techniques require a technique that makes it possible to perform stable code amount control with reduced occurrence of image quality degradation, buffer overflow or underflow, and the like in the same way whether a scene change occurs or does not occur.

Consequently, an object of this invention is to provide a moving-image encoding device, a moving-image encoding method, and a program that make it possible to solve the aforementioned problems.

Means for Solving the Problems

According to a first aspect of the present invention, a moving-image encoding device is provided including: an encoding unit that calculates a code amount generated by encoding a moving image including an I picture, a P picture, and a B picture as picture types; a complexity calculation unit that calculates a complexity history of the picture which is encoded on the basis of the code amount and a quantization width used in the encoding; and a complexity estimation unit that estimates an estimated complexity of an encoding object picture to be encoded on the basis of the complexity history of the same picture type as a picture type of the encoding object picture and the complexity history of the encoded picture immediately preceding the encoding object picture.

According to a second aspect of the present invention, a moving-image encoding method is provided including: calculating a code amount generated by encoding a moving image including an I picture, a P picture, and a B picture as picture types and calculating a complexity history of the picture which is encoded on the basis of the code amount and a quantization width used in the encoding; and estimating an estimated complexity of an encoding object picture to be encoded on the basis of the complexity history of the same picture type as a picture type of the encoding object picture and the complexity history of the encoded picture immediately preceding the encoding object picture.

According to a third aspect of the present invention, a program is provided causing a computer of a moving-image encoding device to function as: an encoding unit that calculates a code amount generated by encoding a moving image including an I picture, a P picture, and a B picture as picture types; a complexity calculation unit that calculates a complexity history of the picture which is encoded on the basis of the code amount and a quantization width used in the encoding; and a complexity estimation unit that estimates an estimated complexity of an encoding object picture to be encoded on the basis of the complexity history of the same picture type as a picture type of the encoding object picture and the complexity history of the encoded picture immediately preceding the encoding object picture.

Advantageous Effects of the Invention

According to the present invention, not only the complexity history of the encoded picture of the same picture type as the encoding object picture but also the influence of a change in the complexity of a picture immediately preceding the encoding object picture can be reflected in the encoding object picture, and thus it is possible to perform code amount control with reduced occurrence of image quality degradation, buffer overflow or underflow, and the like.

EXAMPLE EMBODIMENTS

Hereinafter, a moving-image encoding device according to an embodiment of the present invention will be described with reference to the accompanying drawings.

Figure 1:
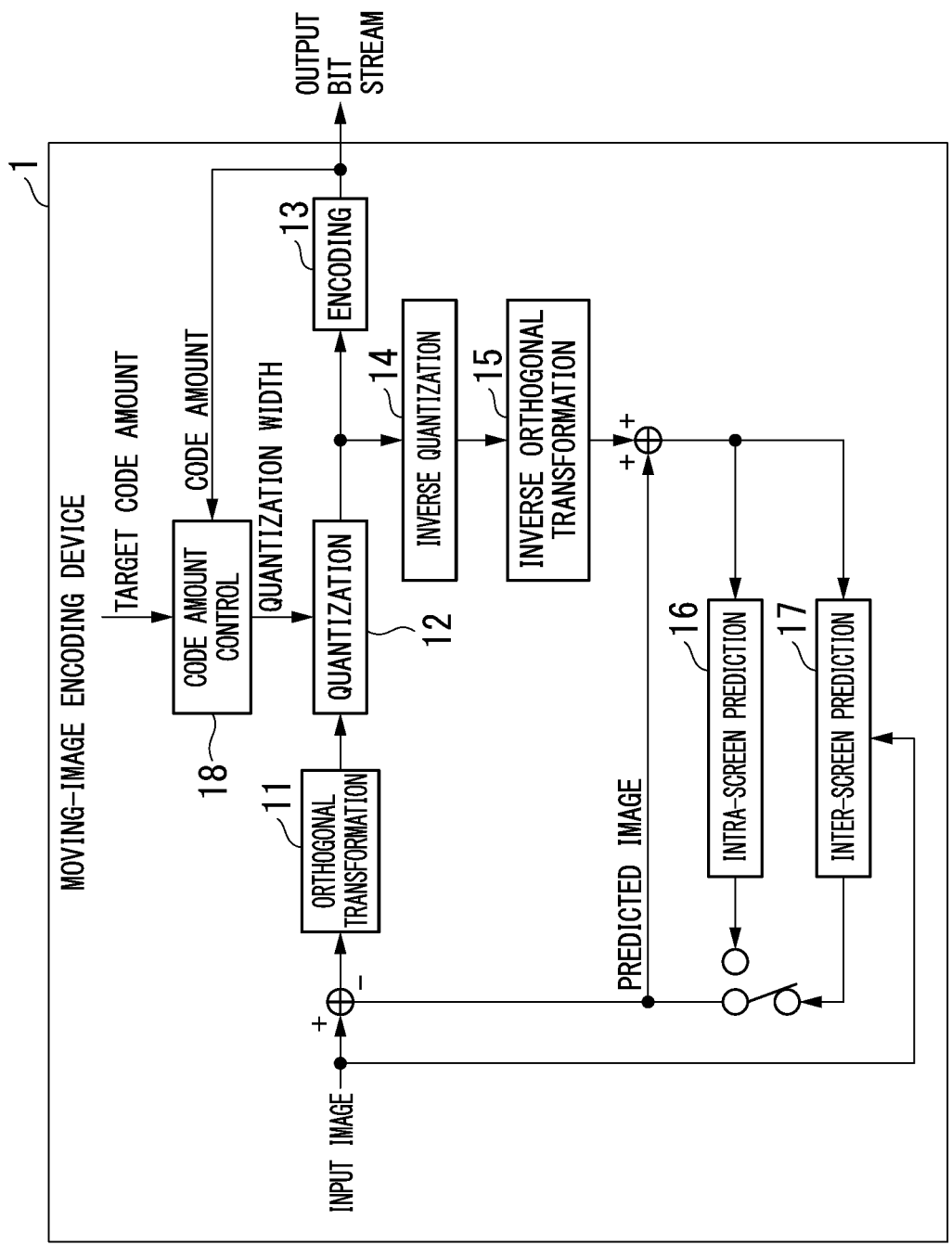
FIG. 1 is a block diagram illustrating a moving-image encoding device according to an embodiment of the present invention.

FIG. 1 is a block diagram illustrating a configuration of a moving-image encoding device according to the embodiment.

A moving-image encoding device 1 includes each functional unit of an orthogonal transformation unit 11, a quantization unit 12, an encoding unit 13, an inverse quantization unit 14, an inverse orthogonal transformation unit 15, an intra-screen prediction unit 16, an inter-screen prediction unit 17, and a code amount control unit 18.

The orthogonal transformation unit 11 orthogonally transforms a difference between an input image and a predicted image.

The quantization unit 12 quantizes an orthogonally transformed coefficient with a given quantization width.

The encoding unit 13 performs variable-length encoding on quantized data.

The inverse quantization unit 14 inversely quantizes the quantized data.

The inverse orthogonal transformation unit 15 transforms an inversely quantized coefficient.

The intra-screen prediction unit 16 generates an intra-screen predictive encoded image (I picture) using pixels within an image.

The inter-screen prediction unit 17 generates an inter-screen uni-directional predictive encoded image (P picture) and an inter-screen bi-directional predictive encoded image (B picture) using pixels of another frame image and pixels within an image of an encoding object frame.

The code amount control unit 18 calculates a quantization width from a given target code amount and a code amount which is output by the encoding unit 13.

Figure 2:
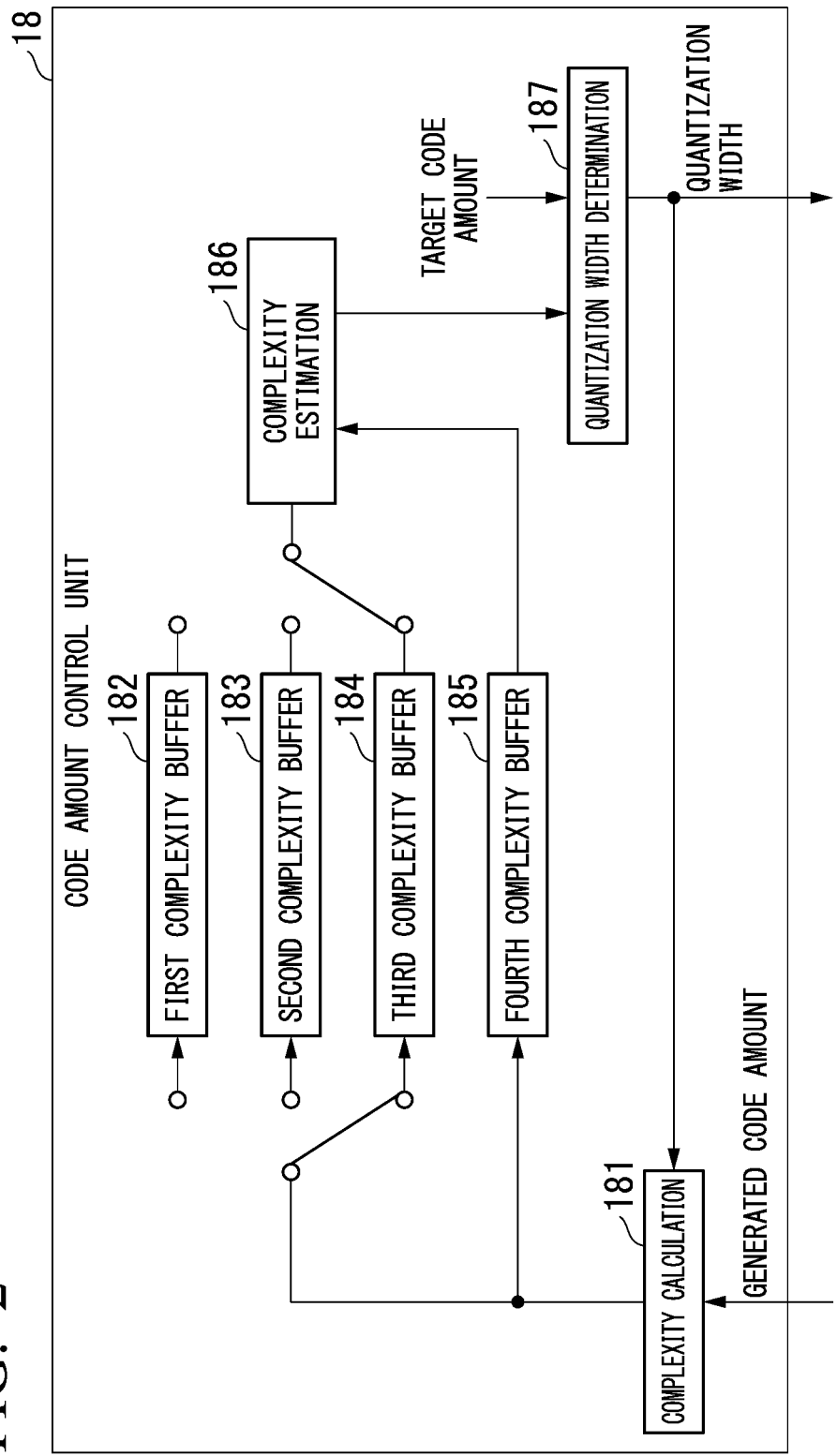
FIG. 2 is a block diagram illustrating a code amount control unit in the moving-image encoding device according to an embodiment of the present invention.

FIG. 2 is a functional block diagram of the code amount control unit 18.

As shown in FIG. 2, the code amount control unit 18 includes a complexity calculation unit 181, a first complexity buffer 182, a second complexity buffer 183, a third complexity buffer 184, a fourth complexity buffer 185, a complexity estimation unit 186, and a quantization width determination unit 187.

The complexity calculation unit 181 calculates a complexity from the quantization width used in the quantization of an orthogonally transformed image signal and the code amount generated by the encoding unit 13.

The first complexity buffer 182 stores the past complexity of an I frame image. That is, the first complexity buffer 182 stores a complexity history of an encoded I picture.

The second complexity buffer 183 stores the past complexity of a P frame image. That is, the second complexity buffer 183 stores a complexity history of an encoded P picture.

The third complexity buffer 184 stores the past complexity of a B frame image. That is, the third complexity buffer 184 stores a complexity history of an encoded B picture.

In this manner, the complexity calculation unit 181 stores a complexity history of an encoded picture whose picture type is I, and the second complexity buffer 183 and the third complexity buffer 184 store complexity histories of encoded pictures whose respective picture types are P and B.

The fourth complexity buffer 185 stores the complexity of an encoded picture immediately preceding an encoding object picture to be encoded. The complexity history of an immediately preceding picture stored in the fourth complexity buffer 185 may be one immediately preceding picture, or may be an average value, an intermediate value, or the like of a plurality of pictures.

The complexity estimation unit 186 estimates the complexity of an encoding object picture to be encoded next from the past complexity history.

The quantization width determination unit 187 calculates a quantization width from an estimated complexity calculated by the complexity estimation unit 186 and a target code amount.

Figure 3:
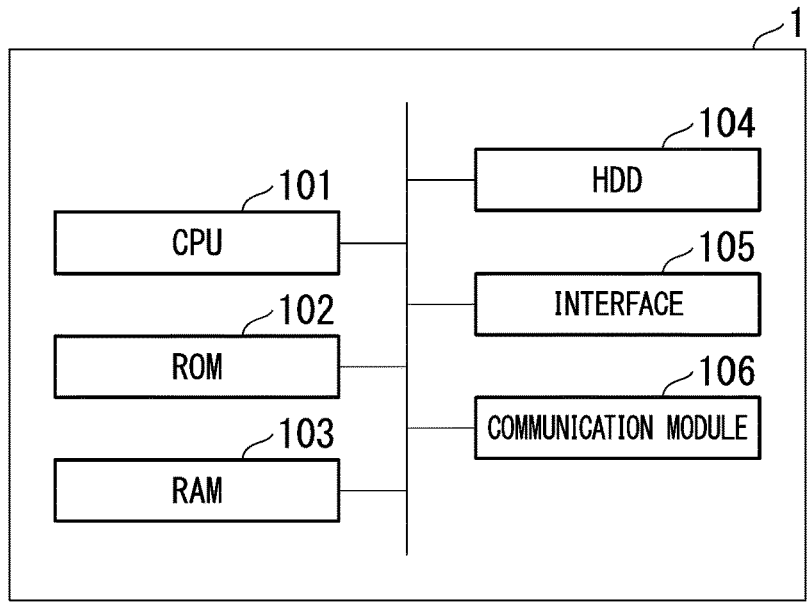
FIG. 3 is a block diagram illustrating a hardware configuration of the moving-image encoding device according to an embodiment of the present invention.

FIG. 3 is a block diagram illustrating a hardware configuration of the moving-image encoding device.

As shown in FIG. 3, the moving-image encoding device 1 may include hardware such as a central processing unit (CPU) 101, a read only memory (ROM) 102, a random access memory (RAM) 103, a hard disk drive (HDD) 104, an interface 105, and a communication module 106. Each function shown in FIG. 1 or 2 may be constituted inside the CPU of the moving-image encoding device 1 by the computer of the moving-image encoding device 1 constituting a moving-image encoding program. Alternatively, these functions may be constituted by circuits or the like.

In the relevant technique, a great deviation between the target code amount and a generated code amount causes the buffer memory of an output bit stream to overflow or underflow, which leads to the possibility of decoding not being able to be performed. In the relevant technique, the product (X=S*Q) of a generated code amount S of an encoded picture and a quantization width Q is defined as a complexity X, and the complexity of a picture to be encoded next is estimated from the complexity history of a picture encoded in the past. Next, in the relevant technique, a quantization width which is predicted to satisfy the target code amount is determined on the basis of the estimated complexity Xest. The quantization width Q can be calculated as follows using the estimated complexity Xest and the target code amount T.

$$Xest = X$$

$$Q = Xest \div T$$

In moving-image encoding such as H.265/HEVC, since there is a difference in a relationship between the quantization width Q and the generated code amount S depending on a picture type (an I picture, a P picture, or a B picture), the complexity of the past picture is recorded for each picture type in the relevant technique, and the complexity history of a corresponding picture type is used when the estimated complexity is calculated. Generally, an I picture has the lowest compression ratio, and the compression ratio improves in the order of a P picture and a B picture.

In the relevant technique, code amount control is performed on the assumption that the complexity of a picture to be encoded next is the same as that of a picture encoded in the past. However, in a case where a great change occurs in an input image like a scene change, the property of the image changes and thus the complexity also changes. As a result, the amount of code cannot be controlled appropriately. There is a relevant technique which is a method of calculating the estimated complexity by using not only the complexity history of the past picture but also an activity that is a parameter indicating an image characteristic together. The activity is a parameter that can be calculated from an input image such as the variance of luminance values. In the technique, estimated complexities $Xest\_i$, $Xest\_p$, and $Xest\_b$ for each picture type are calculated by weighting the ratio of activities $ACTi\_p$, $ACTp\_p$, and $ACTb\_p$ of the past picture to activities $ACTi$, $ACTp$, and $ACTb$ of a picture to be encoded with the past complexity histories $Xi\_p$, $Xp\_p$, and $Xb\_p$.

$$Xest\_i = Xi\_p * (ACTi \div ACTi\_p)$$

$$Xest\_p = Xp\_p * (ACTp \div ACTp\_p)$$

$$Xest\_b = Xb\_p * (ACTb \div ACTb\_p)$$

This makes it possible to select a quantization width according to a scene even in a case where the complexity history of the past picture and the complexity of the next picture are not the same degree due to a scene change or the like.

However, in a code amount control technique, the complexity of the next picture is estimated using only information of the same picture type. Therefore, in a case where the complexity changes greatly due to a scene change or the like, a change in the complexity cannot be reflected in the estimation of complexity of other picture types. For example, in a case where the complexity changes greatly in a certain P picture, the complexity is also more likely to change greatly in the subsequent B picture. Thus, it is preferable that a complexity change in a P picture be reflected in a B picture.

In addition, since a change in activity does not necessarily correspond to a change in complexity, the influence of a scene change cannot be reflected in the estimation of the complexity in a scene change in which the activity does not change. As a result, since a quantization width is determined by an estimated complexity which is greatly different from an actual complexity, the generated code amount deviates greatly from the target code amount, which leads to causing image quality degradation and buffer overflow or underflow. Therefore, the present invention performs the following processing.

The moving-image encoding device 1 inputs a moving image. The moving image is constituted by a plurality of pictures which are input in order. The pictures are an I picture (Intra-Picture; intra-screen predictive encoded image), a P picture (Predictive-Picture; inter-screen unidirectional encoded image), and a B picture (Bi-directional Predictive-Picture; inter-screen bi-directional predictive encoded image).

In a case where an input picture is an I picture, the moving-image encoding device 1 inputs a difference between an input image of the I picture and a predicted image of the I picture to the orthogonal transformation unit 11. The orthogonal transformation unit 11 performs an orthogonal transformation on the difference between the input image and the predicted image, and calculates an orthogonal transformation coefficient. The orthogonal transformation unit 11 outputs the orthogonal transformation coefficient to the quantization unit 12.

The quantization unit 12 inputs the orthogonal transformation coefficient. The quantization unit 12 quantizes the orthogonal transformation coefficient. For example, the quantization unit 12 divides the orthogonal transformation coefficient by a quantization width which is input from the code amount control unit 18 and a quantization matrix corresponding to each frequency component to quantize the result. The quantization unit 12 outputs the quantized orthogonal transformation coefficient to the encoding unit 13. The encoding unit 13 performs variable-length encoding on the quantized orthogonal transformation coefficient to output the result as an output bit stream.

On the other hand, the orthogonal transformation coefficient quantized by the quantization unit 12 is input by the inverse quantization unit 14. The inverse quantization unit 14 inversely quantizes the quantized orthogonal transformation coefficient to output the result to the inverse orthogonal transformation unit 15. The inverse orthogonal transformation unit 15 performs an inverse orthogonal transformation on the inversely quantized orthogonal transformation coefficient. The inverse orthogonal transformation data is a locally decoded image. The intra-screen prediction unit 16 generates and outputs a predicted image of the I picture using the orthogonal transformation coefficient after the inverse orthogonal transformation.

In addition, even in a case where the input picture which is input by the moving-image encoding device 1 is a P picture or a B picture, similarly to the I picture, the moving-image encoding device 1 inputs a difference between an input image of the P picture and a predicted image of the P picture or a difference between an input image of the B picture and a predicted image of the B picture to the orthogonal transformation unit 11. The orthogonal transformation unit 11 performs an orthogonal transformation on the difference between each input image and each predicted image and calculates an orthogonal transformation coefficient. The orthogonal transformation unit 11 outputs the orthogonal transformation coefficient to the quantization unit 12.

The quantization unit 12 inputs the orthogonal transformation coefficient. The quantization unit 12 quantizes the orthogonal transformation coefficient. For example, the quantization unit 12 divides the orthogonal transformation coefficient by a quantization width which is input from the code amount control unit 18 and a quantization matrix corresponding to each frequency component to quantize the result. The quantization unit 12 outputs the quantized orthogonal transformation coefficient to the encoding unit 13. The encoding unit 13 performs variable-length encoding on the quantized orthogonal transformation coefficient to output the result as an output bit stream.

On the other hand, the orthogonal transformation coefficient quantized by the quantization unit 12 is input by the inverse quantization unit 14. The inverse quantization unit 14 inversely quantizes the quantized orthogonal transformation coefficient to output the result to the inverse orthogonal transformation unit 15.

The inverse orthogonal transformation unit 15 performs an inverse orthogonal transformation on the inversely quantized orthogonal transformation coefficient. The inverse orthogonal transformation data is a locally decoded image.

The intra-screen prediction unit 16 generates and outputs a predicted image of the P picture or a predicted image of the B picture using the orthogonal transformation coefficient after the inverse orthogonal transformation relating to the P picture or the B picture.

Figure 4:
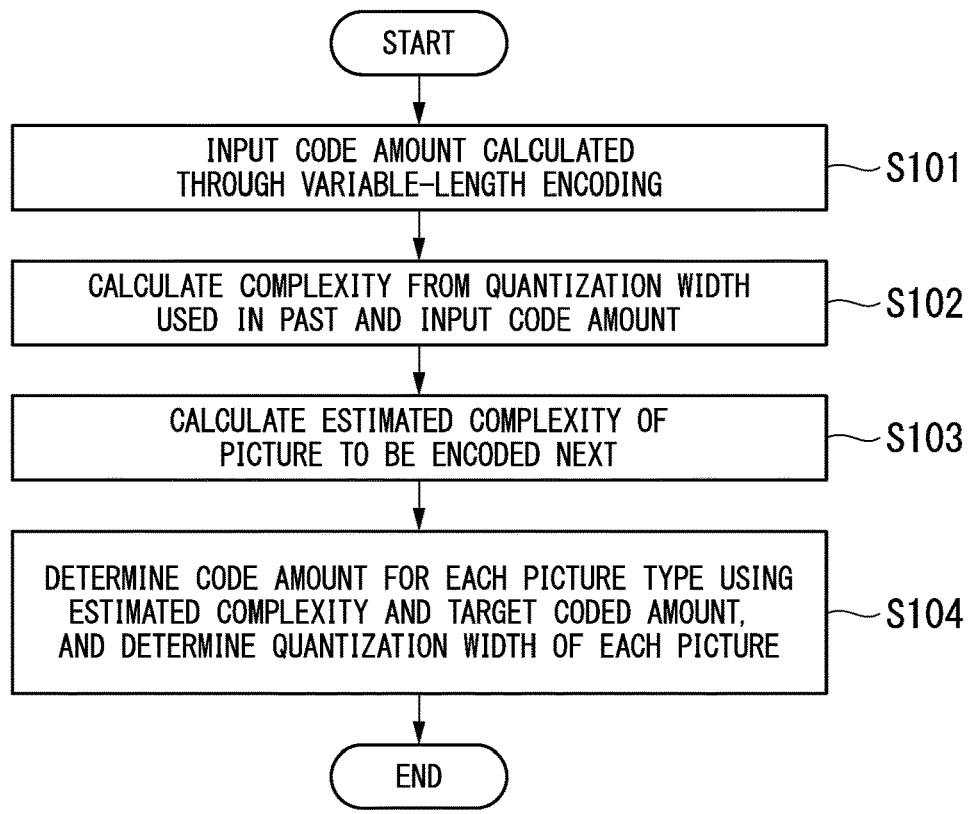
FIG. 4 is a flow chart illustrating a process flow of a code amount control process according to an embodiment of the present invention.

FIG. 4 is a diagram illustrating a process flow of a code amount control process.

Next, processing of the code amount control unit 18 will be described.

The code amount control unit 18 inputs a target code amount and a code amount which is calculated by the encoding unit 13 through variable-length encoding (step S101). Next, the complexity calculation unit 181 calculates a complexity from a quantization width used in the past and the code amount calculated by the encoding unit 13 (step S102). Specifically, the complexity calculation unit 181 calculates the product of the code amount S calculated by the encoding unit 13 with respect to each encoded picture and the quantization width Q as the complexity X. Through such a process, the complexity calculation unit 181 calculates the complexity Xi_p of an I picture, the complexity Xp_p of a P picture, and the complexity Xb_p of a B picture.

The complexity calculation unit 181 records the complexity Xi_p of the encoded I picture in the first complexity buffer 182 and the fourth complexity buffer 185.

The complexity calculation unit 181 records the complexity Xp_p of the encoded P picture in the second complexity buffer 183 and the fourth complexity buffer 185.

The complexity calculation unit 181 records the complexity Xb_p of the encoded B picture in the third complexity buffer 184 and the fourth complexity buffer 185.

Each of the first complexity buffer 182, the second complexity buffer 183, and the third complexity buffer 184 stores the past complexity history of each picture type.

The fourth complexity buffer 185 stores the complexity of an immediately preceding picture. The immediately preceding picture is an immediately preceding encoded picture based on the encoding order or display order of encoding object pictures to be encoded. In the complexity buffers for each picture type (the first complexity buffer 182, the second complexity buffer 183, and the third complexity buffer 184) and the complexity buffer of the immediately preceding picture (the fourth complexity buffer 185), the complexity to be stored may be one immediately preceding corresponding picture, or may be an average, an intermediate value, or the like of a predetermined number of pictures. In addition, an immediately preceding estimated complexity history Xest_m_p estimated by the complexity estimation unit 186 is recorded in the fourth complexity buffer 185.

The complexity estimation unit 186 calculates the estimated complexities Xest_i, Xest_p, and Xest_b of a picture to be encoded next in the following Expressions (1) to (3) from the complexity histories Xi_p, Xp_p, and Xb_p for each picture type recorded in the first complexity buffer 182, the second complexity buffer 183, and the third complexity buffer 184, and the immediately preceding complexity history Xm_p and the immediately preceding estimated complexity history Xest_m_p recorded in the fourth complexity buffer 185 (step S103). In the following expression, "*" indicates a product.

$$Xest\_i = Xi\_p * (Xm\_p \div Xest\_m\_p) \quad (1)$$

$$Xest\_p = Xp\_p * (Xm\_p \div Xest\_m\_p) \quad (2)$$

$$Xest\_b = Xb\_p * (Xm\_p \div Xest\_m\_p) \quad (3)$$

Thereby, the influence of a change in the complexity of an immediately preceding picture can be reflected in a picture to be encoded next regardless of the picture type. The quantization width determination unit 187 determines a code amount for each picture type using the estimated complexity and the target code amount and determines the quantization width of each picture (step S104). Specifically, the quantization width determination unit 187 calculates the quantization width Q (Qi, Qp, Qb) as follows using the estimated complexity Xest and the target code amount T.

$$Qi = Xest\_i \div T \quad (4)$$

$$Qp = Xest\_p \div T \quad (5)$$

$$Qb = Xest\_b \div T \quad (6)$$

The immediately preceding complexity histories Xm_p and Xest_m_p described above may be used as a lower limit of the estimated complexity as will be shown below. This is because the complexity has a high possibility of causing a problem of the generated code amount decreasing and the image quality being degraded to the extent that it is estimated to be larger than it actually is, whereas the generated code amount increases and a buffer overflow occurs when it is estimated to be smaller than it actually is, or a problem of the usable code amount of the subsequent picture becoming extremely small and control becoming unstable.

$$Xest\_i = \max(Xi\_p, Xi\_p * (Xm\_p \div Xest\_m\_p)) \quad (6)$$

$$Xest\_p = \max(Xp\_p, Xp\_p * (Xm\_p \div Xest\_m\_p)) \quad (7)$$

$$Xest\_b = \max(Xb\_p, Xb\_p * (Xm\_p \div Xest\_m\_p)) \quad (8)$$

In addition, it is also possible to calculate the activity (ACTi, ACTp, ACTb) of each picture, and to estimate a complexity as follows using the activity.

$$Xest\_i = Xi\_p * (ACTi \div ACTi\_p) * (Xm\_p \div Xest\_m\_p)) \quad (9)$$

$$Xest\_p = Xp\_p * (ACTp \div ACTp\_p) * (Xm\_p \div Xest\_m\_p)) \quad (10)$$

$$Xest\_b = Xb\_p * (ACTb \div ACTb\_p) * (Xm\_p \div Xest\_m\_p)) \quad (11)$$

In addition, in the present embodiment, a scene change may be detected, and a picture complexity estimation method after a scene change may be changed. In addition, in the present embodiment, a change in complexity can be reflected in the estimation of complexity of the next picture even when a scene change cannot be detected by the activity.

According to the above-described process, in a case where the complexity changes greatly, the influence can be reflected in all the subsequent pictures regardless of the picture type, and thus it is possible to perform appropriate code amount control. As a result, it is possible to perform encoding of higher image quality with the same target code amount as before and to perform stable control with less buffer overflow or underflow.

Hereinbefore, in the above-described embodiment, the description is based on the HEVC encoding standard, but other encoding standards such as H.264 or MPEG2 can be similarly applied. In addition, the control unit of a quantization step may also be controlled in other units such as a field, a slice, or an encoding block, instead of in a picture unit.

Figure 5:
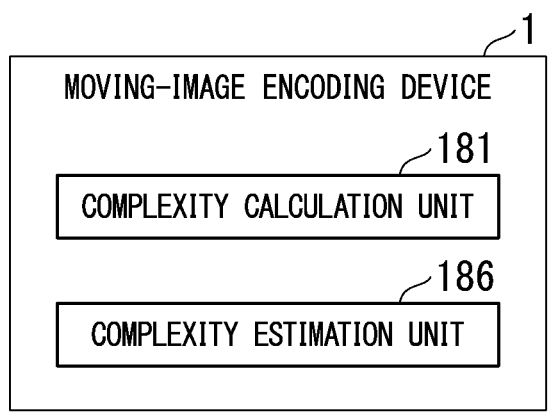
FIG. 5 is a block diagram illustrating a minimum configuration of the moving-image encoding device according to an embodiment of the present invention.

FIG. 5 is a block diagram illustrating a minimum configuration of the moving-image encoding device.

As shown in FIG. 5, the moving-image encoding device is constituted by at least the complexity calculation unit 181 and the complexity estimation unit 186.

The complexity calculation unit 181 calculates the complexity history of each picture type on the basis of a code amount generated by encoding of a moving image constituted by an I picture, a P picture, and a B picture and a quantization width used in the encoding.

The complexity estimation unit 186 estimates the estimated complexity of an encoding object picture on the basis of the complexity history of each picture type of an encoded picture and the complexity history of an encoded picture immediately preceding the encoding object picture.

The above-described moving-image encoding device may have a computer system therein. In this case, each of the above-described processes may be stored in a computer readable recording medium in the format of a program, and the above processes may be performed by a computer reading out and executing this program. The computer readable recording medium referred to here is a magnetic disk, a magneto-optic disc, a CD-ROM, a DVD-ROM, a semiconductor memory, or the like. In addition, such a computer program may be delivered to a computer through a communication line, and the computer having received this delivery may execute the program.

In addition, the program may be a program for realizing some of the above-described functions. Further, the program may be a so-called differential file (a differential program) that makes it possible to realize the above-described functions in combination with programs already recorded in a computer system.

Priority is claimed on Japanese Patent Application No. 2018-126644, filed Jul. 3, 2018, the content of which is incorporated herein by reference.

REFERENCE SIGNS LIST

1 Moving-image encoding device
11 Orthogonal transformation unit
12 Quantization unit
13 Encoding unit
14 Inverse quantization unit
15 Inverse orthogonal transformation unit
16 Intra-screen prediction unit
17 Inter-screen prediction unit
18 Code amount control unit
181 Complexity calculation unit
182 First complexity buffer
183 Second complexity buffer
184 Third complexity buffer
185 Fourth complexity buffer
186 Complexity estimation unit
187 Quantization width determination unit

What is claimed is:

1. A moving-image encoding device comprising:
an encoder that calculates a code amount generated by encoding a moving image including an I picture, a P picture, and a B picture as picture types;
a complexity calculator that calculates a complexity history of the picture which is encoded on the basis of the code amount and a quantization width used in the encoding; and
a complexity estimator that estimates an estimated complexity of an encoding object picture to be encoded on a basis of the complexity history of a same picture type as a picture type of the encoding object picture and the complexity history of the encoded picture immediately preceding the encoding object picture,
wherein the complexity estimator estimates the estimated complexity of the encoding object picture by multiplying a ratio of the complexity history of the encoded picture immediately preceding the encoding object picture to the estimated complexity history of the encoded picture immediately preceding the encoding object picture by the complexity history of the same picture type as the picture type of the encoding object picture.

2. The moving-image encoding device according to claim 1, further comprising:
a quantization width determination unit that determines a quantization width used in the encoding of the encoding object picture on the basis of the estimated complexity and a target code amount; and
a quantization unit that quantizes the encoding object picture on the basis of the quantization width.

3. The moving-image encoding device according to claim 1, wherein the complexity estimator estimates the estimated complexity of the encoding object picture on the basis of the complexity history of the same picture type as the picture type of the encoding object picture and the complexity history of the encoded picture immediately preceding the encoding object picture, regardless of whether the picture type of the immediately preceding encoded picture is different from the picture type of the encoding object picture.

4. The moving-image encoding device according to claim 1, further comprising a plurality of buffers that store the complexity history of the encoded picture for each of the picture types,
wherein the complexity estimator reads out the complexity history of the same picture type as the picture type of the encoding object picture from any one of the plurality of buffers.

5. A moving-image encoding method comprising:
calculating a code amount generated by encoding a moving image including an I picture, a P picture, and a B picture as picture types and calculating a complexity history of the picture which is encoded on the basis of the code amount and a quantization width used in the encoding; and
estimating an estimated complexity of an encoding object picture to be encoded on a basis of the complexity history of a same picture type as a picture type of the encoding object picture and the complexity history of the encoded picture immediately preceding the encoding object picture,
wherein the estimated complexity of the encoding object picture is estimated by multiplying a ratio of the complexity history of the encoded picture immediately preceding the encoding object picture to the estimated complexity history of the encoded picture immediately preceding the encoding object picture by the complexity history of the same picture type as the picture type of the encoding object picture.

6. A non-transitory computer-readable medium storing a program causing a computer of a moving-image encoding device to function as:
an encoder that calculates a code amount generated by encoding a moving image including an I picture, a P picture, and a B picture as picture types;
a complexity calculator that calculates a complexity history of the picture which is encoded on the basis of the code amount and a quantization width used in the encoding; and
a complexity estimator that estimates an estimated complexity of an encoding object picture to be encoded on a basis of the complexity history of a same picture type as a picture type of the encoding object picture and the complexity history of the encoded picture immediately preceding the encoding object picture, and estimates the estimated complexity of the encoding object picture by multiplying a ratio of the complexity history of the encoded picture immediately preceding the encoding object picture to the estimated complexity history of the encoded picture immediately preceding the encoding object picture by the complexity history of the same picture type as the picture type of the encoding object picture.

\* \* \* \* \*